US012781814B2

(12) United States Patent
Nagayama

(10) Patent No.: US 12,781,814 B2
(45) Date of Patent: Nov. 3, 2026

(54) BRAKE DEVICE

(71) Applicant: Nabtesco Corporation, Tokyo (JP)

(72) Inventor: Hiromi Nagayama, Tokyo (JP)

(73) Assignee: COMTESCO CORPORATION, Gifu-ken (JP)

( * ) Notice: Subject to any disclaimer, the term of this patent is extended or adjusted under 35 U.S.C. 154(b) by 366 days.

(21) Appl. No.: 18/506,774

(22) Filed: Nov. 10, 2023

(65) Prior Publication Data

US 2024/0200621 A1 Jun. 20, 2024

(30) Foreign Application Priority Data

Dec. 19, 2022 (JP) ................................. 2022-201973

(51) Int. Cl.
*F16D 55/40* (2006.01)
*F16D 65/18* (2006.01)
*F16D 121/04* (2012.01)
*F16D 127/02* (2012.01)

(52) U.S. Cl.
CPC ............. *F16D 55/40* (2013.01); *F16D 65/18* (2013.01); *F16D 2121/04* (2013.01); *F16D 2127/02* (2013.01)

(58) Field of Classification Search
CPC ...... F16D 55/40; F16D 65/18; F16D 2121/04; F16D 2127/02
USPC ............ 188/71.5, 71.6, 170, 264 B, 264 CC, 188/264 D, 264 F, 264 R, 264 P; 192/70.12, 113.35
See application file for complete search history.

(56) References Cited

U.S. PATENT DOCUMENTS

| | | | | |
|---|---|---|---|---|
| 4,624,650 A * | 11/1986 | Hiruma | F16F 15/129 | 192/70.12 |
| 5,253,737 A * | 10/1993 | Klaue | B60T 1/065 | 192/111.1 |
| 6,585,088 B1 * | 7/2003 | Fontaine | F16D 65/186 | 188/170 |
| 7,909,147 B1 * | 3/2011 | Schnell | F16D 65/853 | 188/264 D |
| 11,136,976 B2 * | 10/2021 | Gerlach | F04C 15/0084 | |
| 2011/0000750 A1 | 1/2011 | Schnell et al. | | |

FOREIGN PATENT DOCUMENTS

| | | | |
|---|---|---|---|
| DE | 60123320 T2 * | 5/2007 | F16D 59/02 |
| JP | 3360135 B2 | 12/2002 | |

OTHER PUBLICATIONS

Notice of Reasons for Refusal dated Jul. 21, 2026, issued in corresponding Japanese Patent Application No. 2022-201973 with English machine translation (7 pgs.).

* cited by examiner

*Primary Examiner* — Christopher P Schwartz
(74) *Attorney, Agent, or Firm* — Pillsbury Winthrop Shaw Pittman, LLP

(57) ABSTRACT

A brake device includes a brake mechanism including a shaft received in a brake chamber capable of being filled with a liquid, the brake mechanism being configured to switch between a braking applied state, in which the brake mechanism restricts a rotational motion of the shaft by generating a braking force, and a braking released state, in which the brake mechanism permits the rotational motion of the shaft by not generating the braking force. In the brake device, the brake chamber is filled with the liquid in the braking applied state, and the brake chamber is evacuated of the liquid in the braking released state.

9 Claims, 2 Drawing Sheets

BRAKE DEVICE

CROSS-REFERENCE TO RELATED APPLICATIONS

This application is based on and claims the benefit of priority from Japanese Patent Application Serial No. 2022-201973 (filed on Dec. 19, 2022), the contents of which are hereby incorporated by reference in their entirety.

TECHNICAL FIELD

The present disclosure relates to a brake device.

BACKGROUND

Traveling motors of conventional vehicle machines may include brake devices, which are classified into wet brakes such as hydraulic motors and dry brakes. For example, a wet brake device includes a brake mechanism (rotatable and stationary friction plates and the like) arranged in oil. When braking is applied (the pressure in the pressure chamber is lower than a predetermined level), the brake spring presses the brake piston, which causes friction between the rotatable and stationary friction plates. While braking is applied, the rotational motion of the rotary shaft of the hydraulic motor is restricted. On the other hand, when the pressure in the pressure chamber increases above a predetermined level, the brake piston moves against the pressing force applied by the brake spring. This reduces the friction between the rotatable and stationary friction plates, so that the braking is released. Once the braking is released, the rotational motion of the rotary shaft of the hydraulic motor is permitted. For example, Japanese Patent No. 3360135 discloses a dry brake device. The dry brake device has an annular space connected to the hydraulic passage of the hydraulic motor. When the pressure in the annular space is lower than a predetermined level, the brake ring is pressed against the brake spring, and thus the braking is applied. While the braking is applied, the rotational motion of the output shaft of the hydraulic motor is restricted. On the other hand, when the pressure in the annular space increases above a predetermined level, the brake ring moves against the pressing force applied by the brake spring. As a result, the braking is released. Once the braking is released, the rotational motion of the output shaft of the hydraulic motor is permitted.

The wet brakes, however, have the following issues. Since the brake mechanism is arranged in the oil, the mechanical efficiency of the hydraulic motor may be compromised due to increased oil agitation resistance and shear resistance between the rotatable and stationary friction plates, etc. At the same time, heat is additionally generated. This raises the temperature of the hydraulic oil and thus consumes the cooling capacity of the vehicle body. In addition, the end surface of the brake piston may adhere to the stopper surface due to the viscosity and other properties of the oil. For this reason, the end surface of the brake piston may be separated from the stopper surface at inconsistent timings during a transition from the braking released state to the braking applied state. As a result, the braking may be applied at inconsistent timings. The dry brakes, on the other hand, suffer from the following drawbacks. When compared with the wet brakes, the dry brakes require more frequent parts replacement or other maintenance works since they wear out more significantly and have shorter service life. The dry brakes also face problems of rust, corrosion and the like. Therefore, it is desirable to reduce the resistance caused by agitation of the liquid and heat generation, and to achieve improved machine efficiency without compromising maintainability.

SUMMARY

The present disclosure is aimed at solving the above problems, and the purpose of the present disclosure is to reduce the resistance caused by agitation of the liquid and heat generation, and to achieve improved machine efficiency without compromising maintainability.

To overcome the above problem, aspects of the present invention are configured as follows. (1) A brake device according to an aspect of the present invention comprises a brake mechanism including a shaft received in a brake chamber capable of being filled with a liquid, the brake mechanism being configured to switch between a braking applied state, in which the brake mechanism restricts a rotational motion of the shaft by generating a braking force, and a braking released state, in which the brake mechanism permits the rotational motion of the shaft by not generating the braking force, wherein the brake chamber is filled with the liquid in the braking applied state, and the brake chamber is evacuated of the liquid in the braking released state.

With this configuration, in the braking applied state, the brake chamber is filled with the liquid, such that the brake mechanism is immersed in the liquid. In other words, in the braking applied state, the brake device operates as a wet brake. On the other hand, in the braking released state, the brake chamber is evacuated of the liquid, such that the brake mechanism is not immersed in the liquid. In other words, in the braking released state, the brake device 1 operates as a dry brake. Therefore, in the braking released state, the rotation of the shaft does not generate resistance caused by agitation of the liquid, shear resistance, or heat. Therefore, it is possible to reduce the resistance caused by agitation of the liquid and heat generation, and to achieve improved machine efficiency without compromising maintainability.

(2) The brake device according to (1) may further comprise a volume changing mechanism configured to change a volume of the brake chamber between a first volume, at which the brake chamber is filled with the liquid, and a second volume, at which the brake chamber is evacuated of the liquid.

(3) In the brake device according to (2), it is also possible that the volume changing mechanism includes a piston housed in a piston chamber that communicates with the brake chamber, and in the braking applied state, the piston stops to hold the volume of the brake chamber at the first volume, and in the braking released state, the piston moves such that the brake chamber has the second volume.

(4) In the brake device according to any one of (1) to (3), it is also possible that the brake device includes: one or more stationary friction plates; and one or more rotatable friction plates configured to rotate integrally with the shaft, and in the braking applied state, the one or more rotatable friction plates contact the one or more stationary friction plates, and in the braking released state, the one or more rotatable friction plates are separated from the one or more stationary friction plates.

(5) In the brake device according to any one of (1) to (4), it is also possible that a common channel is used for applying a pilot pressure such that a hydraulic fluid is supplied to a volume changing mechanism and the brake mechanism, the volume changing mechanism being configured to change a volume of the brake chamber.

(6) In the brake device according to any one of (1) to (5), it is also possible that at least a part of a volume changing mechanism configured to change a volume of the brake chamber is positioned vertically lower than the brake chamber.

(7) In the brake device according to any one of (1) to (6), it is also possible that an intake and exhaust port for intake and exhaust of air into and from the brake chamber communicates with a piston chamber or a spring chamber, the piston chamber housing a piston for adjusting a liquid volume of the brake chamber, the spring chamber housing a spring for applying a spring pressure to the piston.

(8) In the brake device according to any one of (1) to (7), it is also possible that the liquid is evacuated from the brake chamber after or during release of braking.

(9) In the brake device according to any one of (1) to (8), it is also possible that the liquid is supplied to the brake chamber after or during application of braking.

Advantageous Effects

The present disclosure makes it possible to reduce the resistance caused by agitation of the liquid and heat generation and to achieve improved machine efficiency without compromising maintainability.

DESCRIPTION OF THE EMBODIMENTS

Figure 1:
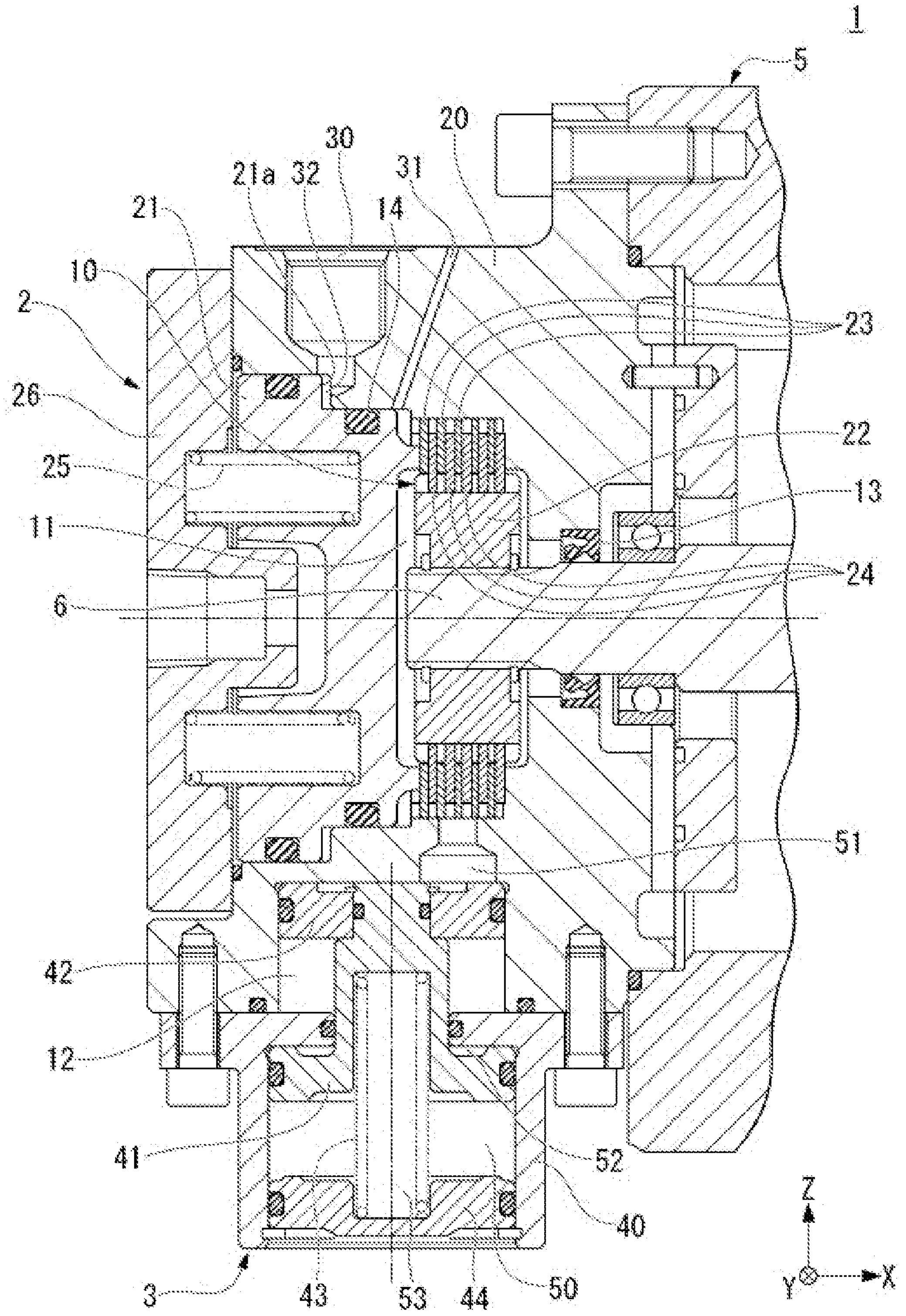
FIG. 1 shows a brake device relating to an embodiment in a braking applied state.

Embodiments of the present disclosure will now be described with reference to the attached drawings. The following embodiments are examples of brake devices with the function of brakes as part of a hydraulic traveling unit in a traveling motor or other device on a vehicle machine. In the following description, terms such as "parallel," "orthogonal," "around" and "coaxial" describe relative or absolute positions. These terms are not only strictly used but also allow some tolerances and relative differences in angle and distance as long as the same effects can be still produced. In the drawings used for the following description, members are shown to different scales into recognizable sizes.

<Brake Device>

Figure 2:
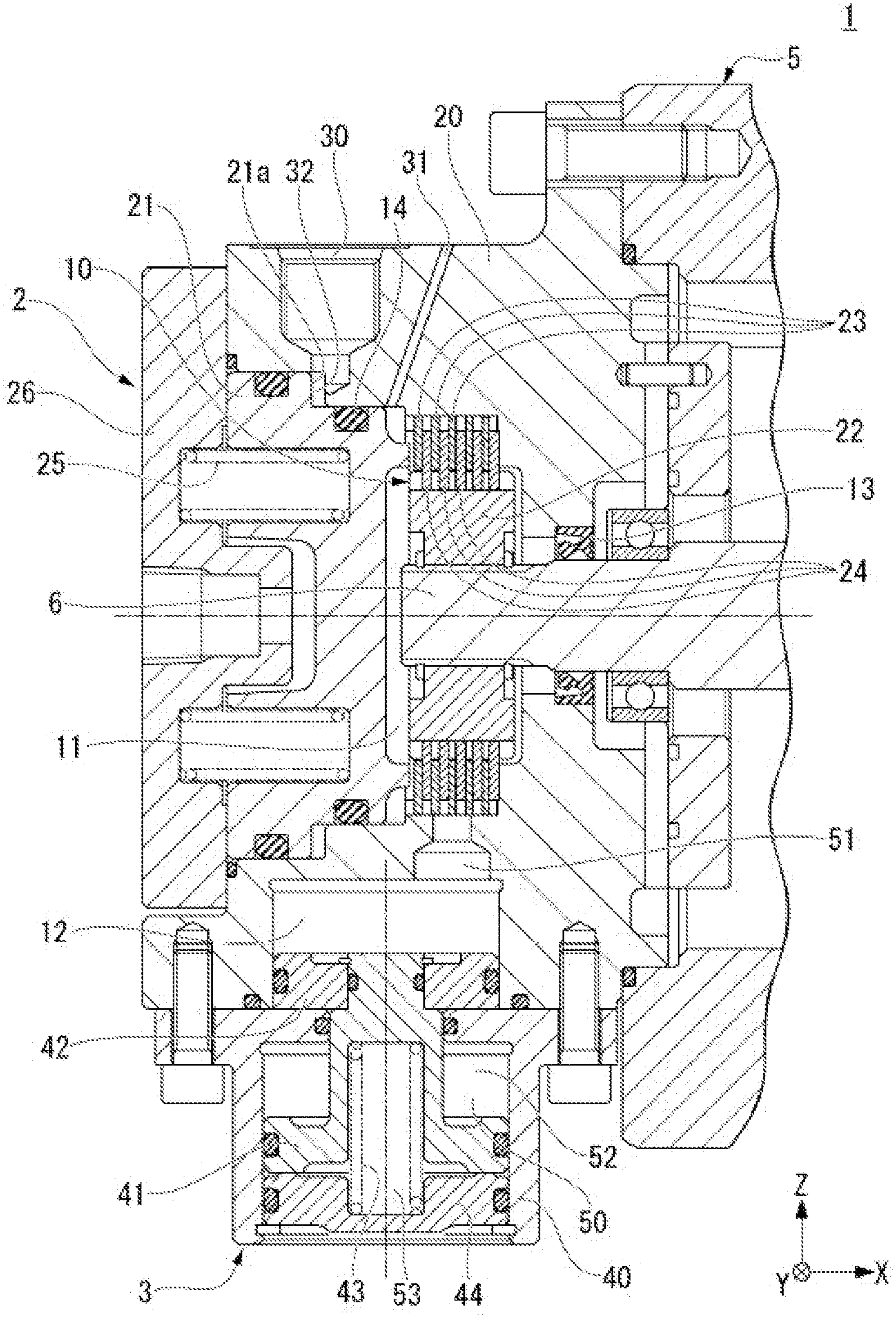
FIG. 2 shows a brake device relating to the embodiment in a braking released state.

FIG. 1 shows a brake device 1 relating to an embodiment in a braking applied state. FIG. 2 shows the brake device 1 relating to the embodiment in a braking released state. Referring to FIGS. 1 and 2 together, the brake device 1 includes a brake mechanism 2 and a volume changing mechanism 3.

<Brake Mechanism>

The brake mechanism 2 includes a brake chamber 10 that can be filled with a lubricating oil (which is hereinafter simply referred to as "oil," as an example of liquid). The brake mechanism 2 includes a shaft 6 that is received in the brake chamber 10. The brake mechanism 2 switches between a braking applied state, in which the rotational motion of the shaft 6 is restricted by generating a braking force, and a braking released state, in which the rotational motion of the shaft 6 is permitted by not generating a brake force.

In the following description, an XYZ orthogonal coordinate system is used as required. The X direction coincides with the axial direction of the shaft 6. The Z direction coincides with the vertical direction (direction of gravity). The Y direction indicates the direction orthogonal to the X and Z directions. The following description is made with the arrows shown in the drawings indicating the X, Y and Z directions, and the head side and the tail side of each arrow indicate the positive (+) side and the negative (−) side, respectively. The upper side and the lower side in the vertical direction are respectively denoted as the +Z side and the −Z side.

The shaft 6 serves as an output shaft of a hydraulic motor 5 (e.g., axial piston motor). For example, the brake mechanism 2 may serve as a parking brake that generates a braking force when the hydraulic motor 5 is not operating. In this case, FIG. 1 corresponds to a state in which the rotation of the output shaft of the hydraulic motor 5 is stopped and the brake mechanism 2 is operating as a parking brake. FIG. 2 corresponds to a state in which the parking brake is released and the rotation of the output shaft of the hydraulic motor 5 is permitted.

The brake mechanism 2 includes a rear flange 20, a brake piston 21, a brake hub 22, stationary friction plates 23, rotatable friction plates 24, a brake spring 25, and a brake cover 26.

The rear flange 20 is fixed to a portion of the hydraulic motor 5 with bolts or other fastening members. The rear flange 20 houses the brake piston 21, a portion of the shaft 6, the brake hub 22, the stationary friction plate 23, the rotatable friction plate 24, and the brake spring 25. The shaft 6 is rotatably supported on the rear flange 20. Although not shown, the rear flange 20 may include a control valve and a hydraulic port for the hydraulic motor 5.

The rear flange 20 has a pilot pressure port 30 to which pilot pressure is input, and an intake and exhaust port 31 for intake and exhaust of the air for the brake chamber 10. The pilot pressure port 30 and the intake and exhaust port 31 are located in the upper portion of the rear flange 20. The intake and exhaust port 31 is located between the pilot pressure port 30 and the brake chamber 10.

The brake piston 21 is attached to the inner peripheral surface of the rear flange 20 so as to be movable in the axial direction (X direction). The brake piston 21 is inserted into the rear flange 20 through an opening at one end (on the −X side) of the rear flange 20. The brake piston 21 is located between one end of the shaft 6 (on the −X side), which is supported by the rear flange 20, and the brake cover 26 mounted to the one end of the rear flange 20. The brake piston 21 is located coaxially with the shaft 6. The brake piston 21 has a stepped tubular shape. The brake piston 21 has a step **21*a* at the portion facing the pilot pressure port 30. An annular space 32 is formed between the step 21*a* of the brake piston 21 and the inner portion of the rear flange 20 so as to extend along the outer periphery of the brake piston 21**.

The brake piston 21 forms a part of the brake chamber 10 together with the rear flange 20. The portion of the brake chamber 10 that is defined by the inner surface of the side opening of the rear flange 20 and one side surface of the brake piston 21 is hereinafter also referred to as "the first chamber 11." The first chamber 11 is isolated from the hydraulic oil on the hydraulic motor 5 side by an oil seal 13 provided on the inner periphery of the rear flange 20. The first chamber 11 is isolated from the pilot pressure port 30 by a piston seal 14 provided on the outer periphery of the brake piston 21.

The brake hub 22 is located coaxially with the shaft 6. The brake hub 22 has a tubular shape extending along the outer periphery of the portion of the shaft 6 that is housed in the brake chamber 10. The inner peripheral portion (radially inner portion) of the brake hub 22 is fixed to the portion of the shaft 6 that is housed in the brake chamber 10. The brake hub 22 rotates integrally with the shaft 6.

The stationary friction plates 23 have an annular shape coaxial with the shaft 6. The outer peripheral portions (radially outer portions) of the stationary friction plates 23 are mounted to the inner portion of the rear flange 20 facing the brake chamber 10. The rotational motion of the stationary friction plates 23 is prohibited by the rear flange 20. Thus, the stationary friction plates 23 do not rotate integrally with the shaft 6. For example, the stationary friction plates 23 are mounted to the rear flange 20 by spline connection so as to be movable in the axial direction (X direction). The movable range of the stationary friction plates 23 in the axial direction is restricted by the brake piston 21.

The rotatable friction plates 24 have an annular shape coaxial with the shaft 6. The inner peripheral portions (radially inner portions) of the rotatable friction plates 24 are mounted to the outer peripheral portion (radially outer portion) of the brake hub 22. The rotatable friction plates 24 rotate integrally with the shaft 6 together with the brake hub 22. For example, the rotatable friction plates 24 are mounted to the brake hub 22 by spline connection so as to be movable in the axial direction (X direction). In the braking applied state, the rotatable friction plates 24 contact the stationary friction plates 23. In the braking released state, the rotatable friction plates 24 are separated from the stationary friction plates 23.

A plurality (five in the example shown) of rotatable friction plates 24 and a plurality (five in the example shown) of stationary friction plates 23 are arranged next to each other in the axial direction. The numbers of rotatable friction plates 24 and stationary friction plates 23 provided are not limited to the above, but may be four or less, or six or more. For example, the numbers of rotatable friction plates 24 and stationary friction plates 23 provided can be modified in accordance with design specifications.

The brake spring 25 presses the brake piston 21 in such a direction that the rotatable friction plates 24 and the stationary friction plates 23 contact each other. The brake spring 25 is placed under compression between the brake piston 21 and the brake cover 26. For example, the brake spring 25 is a coil spring. The brake spring 25 is not limited to the above, but may also be a disc spring. For example, the configuration of the brake spring 25 can be modified in accordance with design specifications.

The brake spring 25 presses the brake piston 21 toward the right (+X direction) in the drawing, generating friction between the rotatable friction plates 24 and the stationary friction plates 23, which restricts the rotational motion of the shaft 6. This results in the braking applied state shown in FIG. 1.

<Volume Changing Mechanism>

The volume changing mechanism 3 changes the volume of the brake chamber 10 between a first volume at which the brake chamber 10 is filled with oil and a second volume at which the brake chamber 10 is evacuated of the oil. The volume changing mechanism 3 is positioned vertically lower than the brake chamber 10. The volume changing mechanism 3 is located lower than the brake chamber 10 in the vertical line. The volume changing mechanism 3 includes a housing 40, an oil volume adjusting piston 41 (an example of a piston for adjusting the fluid volume in the brake chamber 10), a divider plate 42, an oil volume adjusting spring 43, and a piston cover 44.

The housing 40 is fixed to the lower portion of the rear flange 20 with bolts or other fastening members. The housing 40 has a tubular shape extending along the Z direction. The housing 40 forms a part of the brake chamber 10 together with the rear flange 20. The portion of the brake chamber 10 that is defined by the inner surface of the lower opening of the rear flange 20 and the upper surface of the housing 40 is hereinafter also referred to as "the second chamber 12." The first and second chambers 11 and 12 communicate with each other through an oil channel 51.

The oil volume adjusting piston 41 is housed in a piston chamber 50 that communicates with the brake chamber 10. The piston chamber 50 is a chamber defined by the inner surface of the housing 40 and the piston cover 44 mounted to the lower portion of the housing 40. In the braking applied state, the oil volume adjusting piston 41 stops to hold the volume of the brake chamber 10 at the first volume. The first volume corresponds to the volume occupied by the first chamber 11 within the brake chamber 10. In the braking released state, the oil volume adjusting piston 41 moves such that the brake chamber 10 has the second volume. The second volume corresponds to the volume of the entire brake chamber 10 (the sum of the first chamber 11 and the second chamber 12).

The oil volume adjusting piston 41 is provided in the brake chamber 10 to extend from the second chamber 12 to the piston chamber 50 that communicates with the second chamber 12. The oil volume adjusting piston 41 is attached to the inner peripheral surface of the housing 40 so as to be movable in the Z direction (corresponding to the vertical direction). The oil volume adjusting piston 41 is inserted into the housing 40 through an opening at the lower end of the housing 40.

The divider plate 42 is located coaxially with the oil volume adjusting piston 41. The divider plate 42 has an annular shape extending along the outer periphery of the upper part of the portion of the oil volume adjusting piston 41 that is housed in the second chamber 12. The inner peripheral portion (radially inner portion) of the divider plate 42 is fixed to the upper part of the portion of the oil volume adjusting piston 41 that is housed in the second chamber 12. The divider plate 42 moves integrally with the oil volume adjusting piston 41. The divider plate 42 is movable in the direction along the Z direction relative to the inner peripheral surface of the lower opening of the rear flange 20.

The oil volume adjusting spring 43 presses the oil volume adjusting piston 41 in such a direction that the upper end of the oil volume adjusting piston 41 (or the upper end of the divider plate 42) contacts the upper wall of the lower opening of the rear flange 20. The oil volume adjusting spring 43 is placed under compression between the oil volume adjusting piston 41 and the piston cover 44. For example, the oil volume adjusting spring 43 is a coil spring. The oil volume adjusting spring 43 is not limited to the above, but may also be a disc spring. For example, the configuration of the oil volume adjusting spring 43 can be modified in accordance with design specifications.

The oil volume adjusting spring 43 presses the oil volume adjusting piston 41 in the upward direction (+Z direction) in the drawing, causing the upper end of the oil volume adjusting piston 41 (or the upper end of the divider plate 42)

to contact the upper wall of the lower opening of the rear flange 20. As a result, the volume of the brake chamber 10 is held at the first volume (corresponding to the volume occupied by the first chamber 11) (the braking applied state).

<Channels>

In this embodiment, a common channel is used for applying a pilot pressure such that hydraulic oil is supplied to the volume changing mechanism 3 and the brake mechanism 2. The channel 52 (hereinafter also referred to as "oil volume adjusting chamber 52") for applying a pilot pressure such that hydraulic oil is supplied to the volume changing mechanism 3 is formed between the lower portion of the oil volume adjusting piston 41 (the portion in contact with the inner peripheral surface of the housing 40) and the inner surface of the housing 40 (the upper wall of the lower opening). The channel 32 for applying a pilot pressure such that hydraulic oil is supplied to the brake mechanism 2 is formed in a portion extending along the outer periphery of the step 21*a* of the brake piston 21 (corresponding to the annular space 32). Both the annular space 32 and the oil volume adjusting chamber 52 communicate with the pilot pressure port 30.

In this embodiment, the intake and exhaust port 31 communicates with the piston chamber 50 that houses the oil volume adjusting piston 41 or the spring chamber 53 that houses the oil volume adjusting spring 43 for applying a spring pressure to the oil volume adjusting piston 41. For example, the upper end opening of the intake and exhaust port 31 may be connected to the piston chamber 50 or the spring chamber 53 through a conduit not shown.

<Operation of Brake Device>

When the pressure at the pilot pressure port 30 is lower than a predetermined level, the braking applied state is entered, and the brake chamber 10 is filled with the oil. In the braking applied state, the brake chamber 10 is filled with the oil, such that the stationary friction plates 23 and the rotatable friction plates 24 are immersed in the oil (as shown in FIG. 1).

On the other hand, when the pilot pressure port 30 reaches or exceeds the predetermined level, this high pressure is applied to the annular space 32 and the oil volume adjusting chamber 52 that communicate with the pilot pressure port 30. This causes the oil volume adjusting piston 41 to move downward in the drawing and the brake piston 21 to move to the left in the drawing. As the brake piston 21 moves to the left in the drawing, the friction weakens (disappears) between the rotatable friction plates 24 and the stationary friction plates 23, and the braking released state is entered (as shown in FIG. 2).

As the oil volume adjusting piston 41 moves downward in the drawing, the oil in the brake chamber 10 moves by gravity from the first chamber 11 to the second chamber 12 of the brake chamber 10. In other words, in the braking released state, the oil is evacuated from the first chamber 11 to the second chamber 12 of the brake chamber 10 through the oil channel 51. Then, the outside air flows through the intake and exhaust port 31 into the first chamber 11 of the brake chamber 10, which contains the rotatable friction plates 24 and the stationary friction plates 23. In this embodiment, the intake and exhaust port 31 is located vertically above the oil level (the liquid level of the oil in the first chamber 11), and therefore, the oil moves (evacuates) smoothly without leaking.

In the braking released state, the oil is evacuated from the first chamber 11 to the second chamber 12 of the brake chamber 10, and the outside air flows into the first chamber 11, such that the stationary friction plates 23 and the rotatable friction plates 24 are not immersed in the oil. Therefore, in the braking released state, the rotation of the shaft 6 does not generate resistance caused by agitation of the oil, shear resistance, or heat between the rotatable friction plates 24 and the stationary friction plates 23. In the braking released state, when the pressure in the pilot pressure port 30 again falls below the predetermined level, the brake device 1 returns to the braking applied state.

In the brake device 1, the oil is evacuated from the brake chamber 10 after or during the release of braking. In the brake device 1, the oil is supplied to the brake chamber 10 after or during the application of braking. The passage for the release of braking typically has an orifice provided therein. The hydraulic oil supplied to the volume changing mechanism 3 introduces a pressure before reduction by the orifice.

Advantageous Effects

As described above, the brake device 1 according to the embodiment includes a brake mechanism 2 including a shaft 6 received in a brake chamber 10 capable of being filled with oil, the brake mechanism 2 being configured to switch between a braking applied state, in which the brake mechanism 2 restricts a rotational motion of the shaft 6 by generating a braking force, and a braking released state, in which the brake mechanism 2 permits the rotational motion of the shaft 6 by not generating the braking force. In the brake device 1, the brake chamber 10 is filled with the oil in the braking applied state, and the brake chamber 10 is evacuated of the oil in the braking released state.

With this configuration, in the braking applied state, the brake chamber 10 is filled with the oil, such that the brake mechanism 2 is immersed in the oil. In other words, in the braking applied state, the brake device 1 operates as a wet brake. On the other hand, in the braking released state, the brake chamber 10 is evacuated of the oil, such that the brake mechanism 2 is not immersed in the oil. In other words, in the braking released state, the brake device 1 operates as a dry brake. Therefore, in the braking released state, the rotation of the shaft 6 does not generate resistance caused by agitation of the oil, shear resistance, or heat. Therefore, it is possible to reduce the resistance caused by agitation of the oil and heat generation, and to achieve improved machine efficiency without compromising maintainability.

The brake device 1 according to the embodiment further includes a volume changing mechanism 3 configured to change a volume of the brake chamber 10 between a first volume, at which the brake chamber 10 is filled with the oil, and a second volume, at which the brake chamber 10 is evacuated of the oil. With this configuration, the brake device 1 can be smoothly switched between wet braking and dry braking by changing the volume of the brake chamber 10 between the first and second volumes.

The volume changing mechanism 3 according to the embodiment includes an oil volume adjusting piston 41 housed in a piston chamber 50 that communicates with the brake chamber 10. In the braking applied state, the oil volume adjusting piston 41 stops to hold the volume of the brake chamber 10 at the first volume, and in the braking released state, the oil volume adjusting piston 41 moves such that the brake chamber 10 has the second volume. With this configuration, the brake device 1 can be smoothly switched between wet braking and dry braking by stopping or moving of the oil volume adjusting piston 41.

The brake mechanism 2 according to the embodiment includes one or more stationary friction plates 23 and one or more rotatable friction plates 24 configured to rotate integrally with the shaft 6. In the braking applied state, the one or more rotatable friction plates 24 contact the one or more stationary friction plates 23, and in the braking released state, the one or more rotatable friction plates 24 are separated from the one or more stationary friction plates 23. With this configuration, in the braking applied state, the brake chamber 10 is filled with the oil, such that the stationary friction plates 23 and the rotatable friction plates 24 are immersed in the oil. On the other hand, in the braking released state, the brake chamber 10 is evacuated of the oil, such that the stationary friction plates 23 and the rotatable friction plates 24 are not immersed in the oil. Therefore, in the braking released state, the rotation of the shaft 6 does not generate resistance caused by agitation of the oil, shear resistance, or heat between the rotatable friction plates 24 and the stationary friction plates 23. Therefore, it is favorable for reducing the resistance caused by agitation of the oil and heat generation, and for achieving improved machine efficiency without compromising maintainability.

In the brake device 1 according to the embodiment, a common channel (corresponding to the pilot pressure port 30) is used for applying a pilot pressure such that a hydraulic fluid is supplied to a volume changing mechanism 3 and the brake mechanism 2, the volume changing mechanism 3 being configured to change a volume of the brake chamber 10. With this configuration, the device configuration is more simple than in the case where separate channels are provided for the volume changing mechanism 3 and the brake mechanism 2.

In the brake device 1 according to the embodiment, a volume changing mechanism 3 configured to change a volume of the brake chamber 10 is positioned vertically lower than the brake chamber 10. With this configuration, in the braking released state, the oil can be smoothly evacuated from the brake chamber 10 by the action of gravity. In addition, the device configuration is more simple than in the case where a separate mechanism is installed for evacuating the oil from the brake chamber 10.

In the brake device 1 according to the embodiment, the intake and exhaust port 31 for intake and exhaust of the air into and from the brake chamber 10 communicates with the piston chamber 50 that houses the oil volume adjusting piston 41 or the spring chamber 53 that houses the oil volume adjusting spring 43 for applying a spring pressure to the oil volume adjusting piston 41. With this configuration, it is possible to allow the air in the brake chamber 10 to circulate between the brake chamber 10 and the piston chamber 50 or the spring chamber 53.

In the brake device 1 according to the embodiment, the oil is evacuated from the brake chamber 10 after or during the release of braking. This configuration reduces the delay in the release of braking.

In the brake device 1 according to the embodiment, the oil is supplied to the brake chamber 10 after or during the application of braking. This configuration reduces the delay in the application of braking.

Variations

The technical scope of the present invention is not limited to the embodiments described above but is susceptible of various modification within the purport of the present invention.

In the above embodiment, the brake device further includes the volume changing mechanism that changes the volume of the brake chamber between a first volume at which the brake chamber is filled with the oil and a second volume at which the brake chamber is evacuated of the oil, but this example is not limitative. For example, it is also possible that the brake device does not include the volume changing mechanism. For example, the brake device can have any configuration as long as the brake chamber is filled with the oil in the braking applied state and the brake chamber is evacuated of the oil in the braking released state. For example, the volume changing mechanism can be provided in various manners in accordance with design specifications.

In the above embodiment, the volume changing mechanism includes a piston housed in a piston chamber that communicates with the brake chamber, and in the braking applied state, the piston stops to hold the volume of the brake chamber at the first volume, and in the braking released state, the piston moves such that the brake chamber has the second volume, but this example is not limitative. For example, it is also possible that the volume changing mechanism does not include the piston. For example, the volume changing mechanism may include (instead of a piston) a cam mechanism and a link mechanism. For example, the volume changing mechanism can be configured in various manners in accordance with design specifications.

In the embodiment described above, the brake device includes: one or more stationary friction plates; and one or more rotatable friction plates configured to rotate integrally with the shaft, and in the braking applied state, the one or more rotatable friction plates contact the one or more stationary friction plates, and in the braking released state, the one or more rotatable friction plates are separated from the one or more stationary friction plates, but this example is not limitative. For example, it is also possible that the brake mechanism does not include the stationary friction plates and the rotatable friction plates. For example, the brake mechanism may include (instead of friction plates) a friction-applied member and a friction member that generates a braking force when pressed against the friction-applied member. For example, the brake mechanism can be configured in various manners in accordance with design specifications.

In the embodiment described above, a common channel is used for applying a pilot pressure such that a hydraulic fluid is supplied to a volume changing mechanism and the brake mechanism, the volume changing mechanism being configured to change a volume of the brake chamber, but this example is not limitative. For example, separate channels may be provided for the volume changing mechanism and the brake mechanism. For example, the channel for applying a pilot pressure can be provided in various manners in accordance with design specifications.

In the embodiment described above, the volume changing mechanism configured to change a volume of the brake chamber is positioned vertically lower than the brake chamber, but this example is not limitative. For example, it is also possible that the volume changing mechanism is not positioned vertically lower than the brake chamber. For example, the volume changing mechanism may be positioned on one side of the brake chamber in the horizontal direction. For example, a part of the volume changing mechanism may be located lower than the brake chamber in the vertical line. For example, at least a part of the volume changing mechanism configured to change a volume of the brake chamber may be positioned vertically lower than the brake chamber. For example, the volume changing mechanism can be positioned in various manners in accordance with design specifications.

In the embodiment described above, an intake and exhaust port for intake and exhaust of air into and from the brake chamber communicates with a piston chamber or a spring chamber, the piston chamber housing a piston for adjusting a liquid volume of the brake chamber, the spring chamber housing a spring for applying a spring pressure to the piston, but this example is not limitative. For example, it is also possible that the intake and exhaust port does not communicate with the piston chamber or the spring chamber. For example, the aspect of connection of the intake and exhaust port can be modified in accordance with design specifications.

In the embodiment described above, the brake device is configured such that the oil is evacuated from the brake chamber after or during the release of braking, but this example is not limitative. For example, it is also possible that the oil is not evacuated from the brake chamber after the release of braking. For example, the brake device can have any configuration as long as the oil is evacuated from the brake chamber in the braking released state (during the release of braking). For example, the aspect of evacuating the oil from the brake chamber can be modified in accordance with design specifications.

In the embodiment described above, the brake device is configured such that the oil is supplied to the brake chamber after or during the application of braking, but this example is not limitative. For example, it is also possible that the oil is not supplied to the brake chamber after the application of braking. For example, the brake device can have any configuration as long as the oil is supplied to the brake chamber in the braking applied state (during the application of braking). For example, the aspect of supplying the oil to the brake chamber can be modified in accordance with design specifications.

In the embodiments described above, the hydraulic motor may be an axial piston motor, but this example is not limitative. For example, it is also possible that the hydraulic motor is another type of motor (e.g., a radial piston motor). For example, the aspect of the hydraulic motor can be modified in accordance with design specifications.

In the embodiment described above, a motor section (corresponding to the hydraulic motor), a brake section (corresponding to the brake device), and the speed reducing section (corresponding to the speed reducing device (not shown)) form an integrated unit, but this example is not limitative. For example, it is also possible that the motor section, brake section, and speed reducing section are separate from each other. For example, the brake device may be independent from other devices. For example, the aspect of the brake device can be modified in accordance with design specifications.

In the embodiment described above, the pilot line (corresponding to the pilot pressure port) for the release of braking is connected to the oil volume adjusting chamber, but this example is not limitative. For example, it is also possible to provide a pilot line dedicated to oil volume adjustment. For example, the pilot line can be provided in various manners in accordance with design specifications.

In the embodiment described above, the pilot line (corresponding to the pilot pressure port) for the release of braking is connected to the annular space and the oil volume adjusting chamber, but this example is not limitative. For example, an orifice or a valve may be placed in between (for each channel). For example, in applying the braking, the oil volume adjustment chamber side may be operated first, such that the braking is applied with the brake chamber filled with the oil. For example, each channel may have an orifice with a different diameter, so as to differentiate the timings of operation. For example, the valve or the like can be provided in various manners in accordance with design specifications.

In the embodiment described above, the intake and exhaust port is provided, but it is also possible to provide an orifice, check valve, bleeder valve or the like at the boundary between the inside and outside air. For example, the aspect of providing the valve or the like at the boundary between the inside and outside air can be modified in accordance with design specifications.

In the embodiments described above, the spring chamber or the piston chamber is filled with a hydraulic oil at a low pressure, but this example is not limitative. For example, the spring chamber or the piston chamber may be open to the atmosphere, instead of being filled with the hydraulic oil at a low pressure. For example, the aspect of the hydraulic oil in the spring chamber or the piston chamber can be modified in accordance with design specifications.

In the embodiment described above, the brake chamber is filled with a lubricating oil, but this example is not limitative. For example, it is also possible that the brake chamber is filled with hydraulic oil (e.g., oil for operation of the motor or brake device). For example, the brake chamber may be filled with a liquid other than oil. For example, the aspect of the liquid filled in the brake chamber can be modified in accordance with design specifications.

In the embodiment described above, the outside air flows through the intake and exhaust port for intake and exhaust of the air into and from the brake chamber, but this example is not limitative. For example, it is also possible that the intake and exhaust port is connected to the piston chamber instead of the outside air, such that the air of the brake chamber is taken in from and exhausted to the piston chamber instead of the outside air. In this case, a check valve may be provided between the intake and exhaust port and the piston chamber. For example, the aspect of connection of the intake and exhaust port can be modified in accordance with design specifications.

In the embodiment described above, the divider plate and the oil volume adjusting piston are formed of separate members and integrated together, but this example is not limitative. For example, it is also possible that the divider plate and the oil volume adjusting piston are integrally formed of a same member. In other words, the divider plate and the oil volume adjusting piston may be formed of one piece. For example, the aspect of the divider plate and the oil volume adjusting piston can be modified in accordance with design specifications.

In the embodiment described above, the rear flange and the housing are formed of separate members and integrated together, but this example is not limitative. For example, it is also possible that the rear flange and the housing are integrally formed of a same member. In other words, the rear flange and the housing may be formed of one piece. For example, the aspect of the rear flange and the housing can be modified in accordance with design specifications.

In the embodiment described above, the oil volume adjusting piston is shown in the drawing to move in the vertical direction, but this configuration is not limitative. For example, as long as the oil volume adjusting piston is positioned lower than the brake chamber, the oil volume adjusting piston may move in any direction (e.g., the depth direction or the horizontal direction in the drawing). For example, the direction of movement of the oil volume adjusting piston can be modified in accordance with design specifications.

The elements of the embodiments described above may be replaced with known elements within the purport of the present invention. Further, the variations described above may be combined. In the embodiments disclosed herein, a member formed of multiple components may be integrated into a single component, or conversely, a member formed of a single component may be divided into multiple components. Irrespective of whether or not the components are integrated, they are acceptable as long as they are configured to attain the object of the invention.

What is claimed is:

1. A brake device comprising:

a brake mechanism including a shaft received in a brake chamber capable of being filled with a liquid, the brake mechanism being configured to switch between a braking applied state, in which the brake mechanism restricts a rotational motion of the shaft by generating a braking force, and a braking released state, in which the brake mechanism permits the rotational motion of the shaft by not generating the braking force, wherein the brake chamber is filled with the liquid in the braking applied state, and the brake chamber is evacuated of the liquid in the braking released state, and wherein, in the braking released state, air flows into the brake chamber as the brake chamber is evacuated of the liquid.

2. The brake device according to claim 1, further comprising: a volume changing mechanism configured to change a volume of the brake chamber between a first volume, at which the brake chamber is filled with the liquid, and a second volume, at which the brake chamber is evacuated of the liquid.

3. The brake device according to claim 2, wherein the volume changing mechanism includes a piston housed in a piston chamber that communicates with the brake chamber, and wherein, in the braking applied state, the piston is stopped to hold the volume of the brake chamber at the first volume, and in the braking released state, the piston moves such that the brake chamber has the second volume.

4. The brake device according to claim 1, wherein the brake device includes:

one or more stationary friction plates; and one or more rotatable friction plates configured to rotate integrally with the shaft, and wherein in the braking applied state, the one or more rotatable friction plates contact the one or more stationary friction plates, and in the braking released state, the one or more rotatable friction plates are separated from the one or more stationary friction plates.

5. The brake device according to claim 1, wherein a common channel is used for applying a pilot pressure such that a hydraulic fluid is supplied to a volume changing mechanism and the brake mechanism, the volume changing mechanism being configured to change a volume of the brake chamber.

6. The brake device according to claim 1, wherein at least a part of a volume changing mechanism configured to change a volume of the brake chamber is positioned vertically lower than the brake chamber.

7. The brake device according to claim 1, wherein an intake and exhaust port for intake and exhaust of air into and from the brake chamber communicates with a piston chamber or a spring chamber, the piston chamber housing a piston for adjusting a liquid volume of the brake chamber, the spring chamber housing a spring for applying a spring pressure to the piston.

8. The brake device according to claim 1, wherein the liquid is evacuated from the brake chamber after or during release of braking.

9. The brake device according to claim 1, wherein the liquid is supplied to the brake chamber after or during application of braking.

* * * * *